United States Patent [19]

Habu

[11] Patent Number: 4,677,556

[45] Date of Patent: Jun. 30, 1987

[54] METHOD FOR INDICATING SPEED CHANGE OPERATIONS TO BE PERFORMED BY A DRIVER OF A CAR

[75] Inventor: Nobuo Habu, Susono, Japan

[73] Assignee: Toyota Jidosha Kabushiki Kaisha, Toyota, Japan

[21] Appl. No.: 590,418

[22] Filed: Mar. 15, 1984

[30] Foreign Application Priority Data

Jan. 12, 1983 [JP] Japan ................................. 58-3214

[51] Int. Cl.⁴ ............................................ B60K 41/18
[52] U.S. Cl. .................................. 364/424.1; 364/442; 74/864; 74/866
[58] Field of Search ...................... 364/424, 424.1, 442, 364/431.05; 74/860, 861, 862, 864, 866, 863, DIG. 7, 335; 73/117.3, 114

[56] References Cited

U.S. PATENT DOCUMENTS

| | | | |
|---|---|---|---|
| 3,121,483 | 2/1964 | Lietz ..................................... | 74/863 |
| 3,347,092 | 10/1967 | Stutson ................................. | 364/442 |
| 4,023,442 | 5/1977 | Woods et al. .......................... | 74/863 |
| 4,463,427 | 7/1984 | Bonnetain ............................. | 364/442 |
| 4,492,112 | 1/1985 | Igarashi et al. ................... | 364/424.1 |
| 4,539,868 | 9/1985 | Habu ..................................... | 74/866 |
| 4,559,599 | 12/1985 | Habu et al. ......................... | 364/424.1 |
| 4,564,906 | 1/1986 | Stephan et al. ................... | 364/424.1 |

Primary Examiner—Gary Chin
Attorney, Agent, or Firm—Cushman, Darby & Cushman

[57] ABSTRACT

A method and apparatus for automatically indicating speed change operations for a car having a manual type transmission and an electronic control unit having a CPU, a ROM and a RAM in which the method comprises the steps of preliminarily storing at least a data map corresponding to equal fuel consumption rate curves into the ROM of the microprocessor, calculating engine load Q/N in accordance with the current engine speed N and intake air flow Q, calculating $V_D \cdot K - Q_D$ from absolute values of the car speed variables $V_D$ and the intake air flow variables $Q_D$ (K indicates correlation factor) at predetermined time points respectively, comparing and determining if the $V_D \cdot K - Q_D$ is below 0 (zero), and indicating either a shift-up or a shift-down operation on a display or refraining from carrying out the speed change determination during the running on a slope in accordance with the result of the determination. The driver of the car having the electronic control unit including the CPU, the ROM and the RAM can run the car under optimum fuel consumption rate for the engine in accordance with the indication of either the shift-up operation or the shift-down operation to be taken by the driver.

17 Claims, 10 Drawing Figures

METHOD FOR INDICATING SPEED CHANGE OPERATIONS TO BE PERFORMED BY A DRIVER OF A CAR

This is a continuation-in-part of Ser. No. 474,325 to Habu, filed Mar. 11, 1983, now issued as U.S. Pat. No. 4,539,868.

BACKGROUND OF THE INVENTION (1) Field of the Invention

The present invention relates to a method and apparatus for indicating a speed change operation to be performed for a car having a manual type transmission, especially to an apparatus for indicating or instructing the car driver speed of proper change operations so as to run the car at a shift position, in view of the optimum fuel consumption rate.

(2) Description of Prior Art

With the deterioration of oil supplying situations, various studies have been done for the better utilization of energies or for the improvement of effective utilization of energy sources, such as oil in different industries, of late. In the motor industry as well, various studies on energies having improved thermal efficiencies and a combustion method for better fuel combustion have been carried out and cars having excellent fuel consumption rate performance are now under manufacture.

However, there is a problem in the combustion method according to prior art that unless the driving operation by a driver is good at acceleration manipulation and speed change operations, the improved fuel consumption rate performance cannot be sufficiently realized. As a method for overcoming the problem as described above, it has been proposed that the fuel consumption rates (its unit is g/ps.H) corresponding to the various running conditions of a car are preliminarily measured and stored in a memory as a data map and an optimum shift position of a gear box of transmission is sought, which will take minimum fuel consumption rate in each running condition, and this is indicated to the driver.

Another method has been also proposed heretofore in which a suitable shift position for a more effective and useful fuel consumption rate is sought in accordance with the running conditions of the car and with equal fuel consumption rate characteristic curves obtainable from the engine speed N (rev./min.) versus the ratio between intake air flow Q (l/min.) and engine speed N (rev./min.) as engine load Q/N (l/rev.), where values having equal fuel consumption rate are plotted as shown in FIG. 1 and an optimum speed change operation can be performed by indicating to the driver a suitable shift operation to be performed on display means or by producing a sound through warning means each time speed change becomes necessary.

FIG. 1 shows the equal fuel consumption rate curve graph. In the FIG. 1 supposing that the current fuel consumption rate is at the point J, and one step shift-up operation has been performed from the current shift position, the engine speed N necessary for maintaining the same car speed V (km/H) can be necessarily determined from the transmission gear ratio. As it can be considered that the horse power P (PS) necessary for maintaining the same car speed remains substantially unchanged even if the shift is carried out, the engine load Q/N when performing the one step shift-up operation can be calculated from the characteristic curves.

As a result, the new fuel consumption rate after the shift-up operation now moves to the point J', i.e., the fuel consumption rate can be improved in this case. In this case, there is almost no change in the angle of inclination α formed by the straight line connecting between the points J and J' regardless of the shift-up operation performed in any running conditions, and the angle α is determined only by the characteristics or the nature of transmission used.

This is also applicable to the case where the shift-down operation is performed from the point K to the point K' in FIG. 1. In such a method described above, however, when the car is running on a slope, e.g., it is running on an ascending slope, a momentary detaching of an accelerator pedal by the driver on the ascending slope makes the engine speed high and puts it in a light load condition. Then, the shift-up indication is displayed on a suitable display, in this case as a result of the determination. On the other hand, when the accelerator pedal is momentarily operated on a descending slope, the engine speed becomes high and it is considered as being in the light load condition so that the similar shift-up indication is carried out.

Accordingly when the shift-up operation is performed on the ascending slope in accordance with the indication thus obtained, the current car speed can be no longer maintained and the car decelerates since the output power is not enough. In this case, however, if the driver operates the accelerator pedal with the shift position as it is, i.e., without change at all, engine vibrations or engine knockings become large an the running becomes difficult.

Similarly, when the shift-up operation is performed on the descending slope in accordance with the indication thus obtained, the acceleration is carried out and there occurs a problem that the engine break can not be effectively operated since the engine speed has been reduced even if the accelerator pedal is released.

SUMMARY OF THE INVENTION

It is therefore a main object of the present invention to provide a method for indicating speed change operations by detecting the condition for not necessitating a speed change determination for the car running on an ascending slope from data indicative of the running conditions of the engine and by refraining from the change speed determination.

It is another object of the present invention to provide a method for indicating speed change operations to be taken by a driver in which the method comprises the steps of comparing the absolute values of the car speed variables and the absolute values of the intake air flow variables and suspending the speed change determination when the speed change operation should not be performed.

It is further object of the present invention to provide a method for indicating speed change operations to be taken by a driver in which a suitable shift position for achieving optimum fuel consumption rate can be indicated on a display for the driver by maintaining the current car speed during running.

It is still another object of the present invention to provide a method for indicating speed change operations in which the driver of the car to which the present invention is applied can run the car under optimum fuel consumption rate for the engine in accordance with the indication of either a shift-up operation or a shift-down operation to be taken by the driver.

It is yet still another object of the present invention to provide a method in which it is not necessary to store a larger volume of data maps into a ROM of a microprocessor in order to control the fuel consumption rate, while an electronic control unit for processing data and for controlling various elements and components of the engine system can be made small and at low cost.

One of the features of the method for indicating speed change operations for a car having a manual type transmission for transmitting the engine output to the wheels, according to the present invention resides in the method having the steps of determining car speed change from the current shift position to another shift position where more improved fuel consumption rate is obtainable, by data indicative of various engine operating conditions including engine loads, shift positions of the transmission and engine speed, in view of the equal fuel consumption rate characteristic curves in which the values having equal fuel consumption rate are plotted with respect to the engine load and engine speed and indicating speed change operation for the transmission in accordance with the result of the determination, characterised in that the method further comprises the step of detecting whether or not a condition for not necessitating the speed change determination is produced for the car running on an ascending or a descending slope by comparing an absolute value of car speed change amount or variable with an absolute value of the engine intake air flow amount or variable at the current running conditions, so as to refrain from the change speed determination when the condition for not necessitating the speed change determination is detected. These and other objects, features and advantages will be better understood from the following description of the embodiments according to the present invention with reference to the attached drawings.

DETAILED DESCRIPTION OF THE PREFERRED EMBODIMENT

Figure 1:
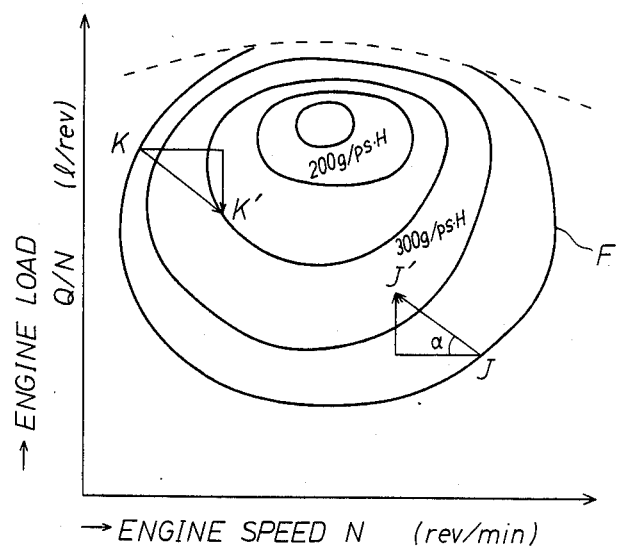
FIG. 1 illustrates equal fuel consumption rate characteristic curves between the engine speed N and the engine load Q/N.
Figure 2:
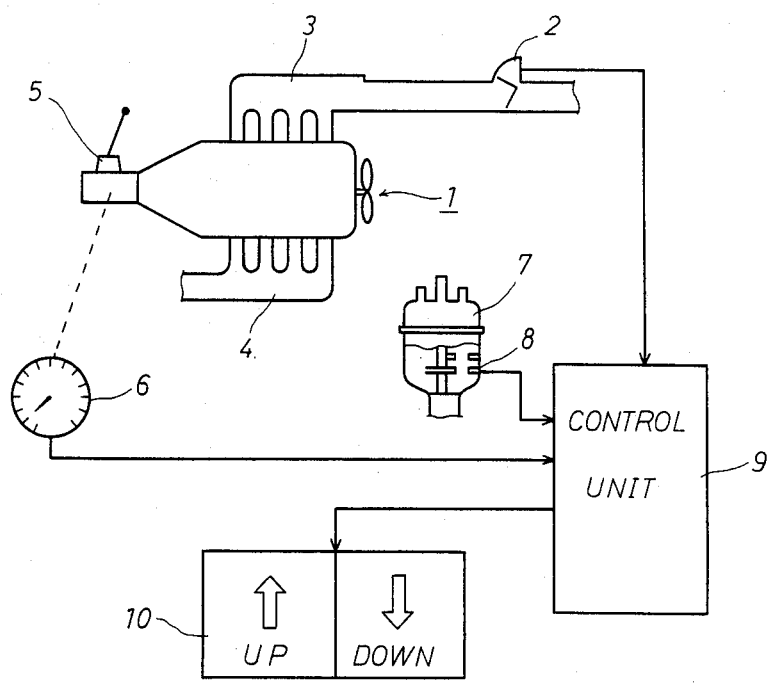
FIG. 2 illustrates an overall engine system including an electronic control unit and display unit for realizing the method according to the present invention.

FIG. 2 shows an overall system including an engine and an electronic control unit according to the present invention. The system comprises an engine 1, an air flow meter 2 for detecting or measuring intake air flow, an intake manifold 3 which supplies intake air to each cylinder of the engine, an exhaust manifold 4 for pooling exhaust gases ejected from each cylinder of the engine and for sending them to a muffler, not shown, through a gas purification unit also not shown, and a transmission 5 of a manual operation type coupled to the output shaft of the engine 1.

The system also comprises a tacho meter or speedometer 6 for detecting and indicating the number of rotations of the output shaft of the transmission, i.e. the car speed, a distributor 7 which rotates one revolution for every two rotations of the crank shaft of the engine 1 and which also distributes an ignition current to a spark plug (not shown) of each cylinder of the engine 1, and a crank angle sensor 8 provided within the distributor 7 and for producing twenty four pulse signals for every one rotation of the distributor 7. The system according to the present invention also comprises an electronic control unit 9 which receives various output signals corresponding to such as air flow, car speed, crank angle etc., from the air flow meter 2, the tacho meter 6, the crank angle sensor 8, etc. so as to make speed change determinations or various optimum shift determinations and to indicate shift operations to be taken by the driver on a display 10, as well as to make different controls for the engine 1.

Figure 3:
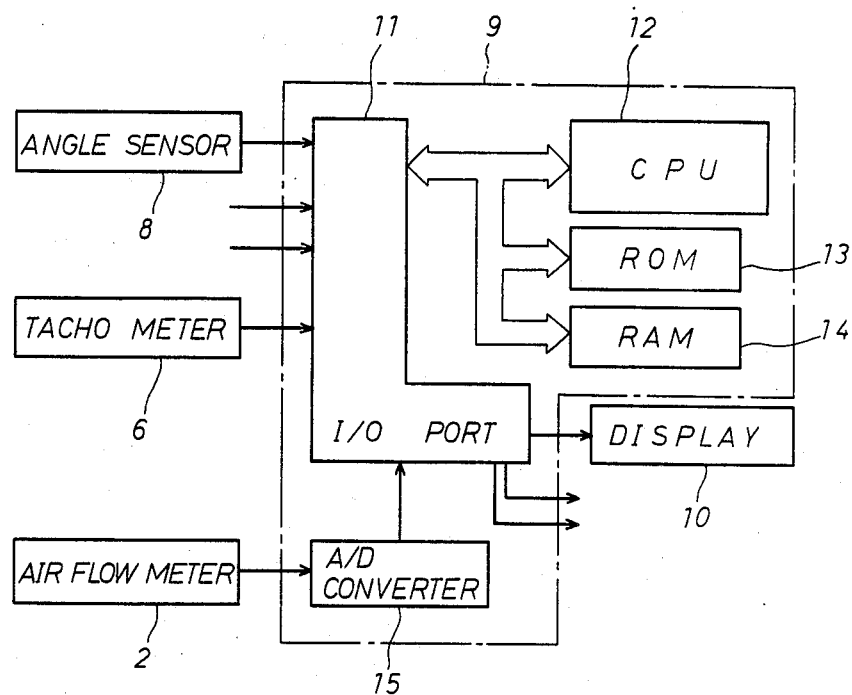
FIG. 3 illustrates a detailed circuit construction of the control unit in FIG. 2.

FIG. 3 shows a detailed circuit construction of the electronic control unit 10 and the associated sensors and meter in FIG. 2, such as the air flow meter 2, the speedometer 6 and the crank angle sensor 8, as well as the display 10. As shown in FIG. 3, the control unit 9 comprises a central processing unit 12 (which is referred to as CPU hereinafter), an input/output port (I/O port) 11, a read only memory (ROM) 13, a random access memory (RAM) 14, and an analog/digital converter (A/D converter) 15. The ROM 13 stores control programs and predetermined control data for the CPU 12 and the RAM 14 temporarily stores various data from the sensors and meters which have been converted by the A/D converter 15.

The CPU 12 performs various calculations and operations for input data in accordance with the control programs stored in the ROM 13 and sends the calculated data to the display 10, as well as controls various operations.

Figure 4:
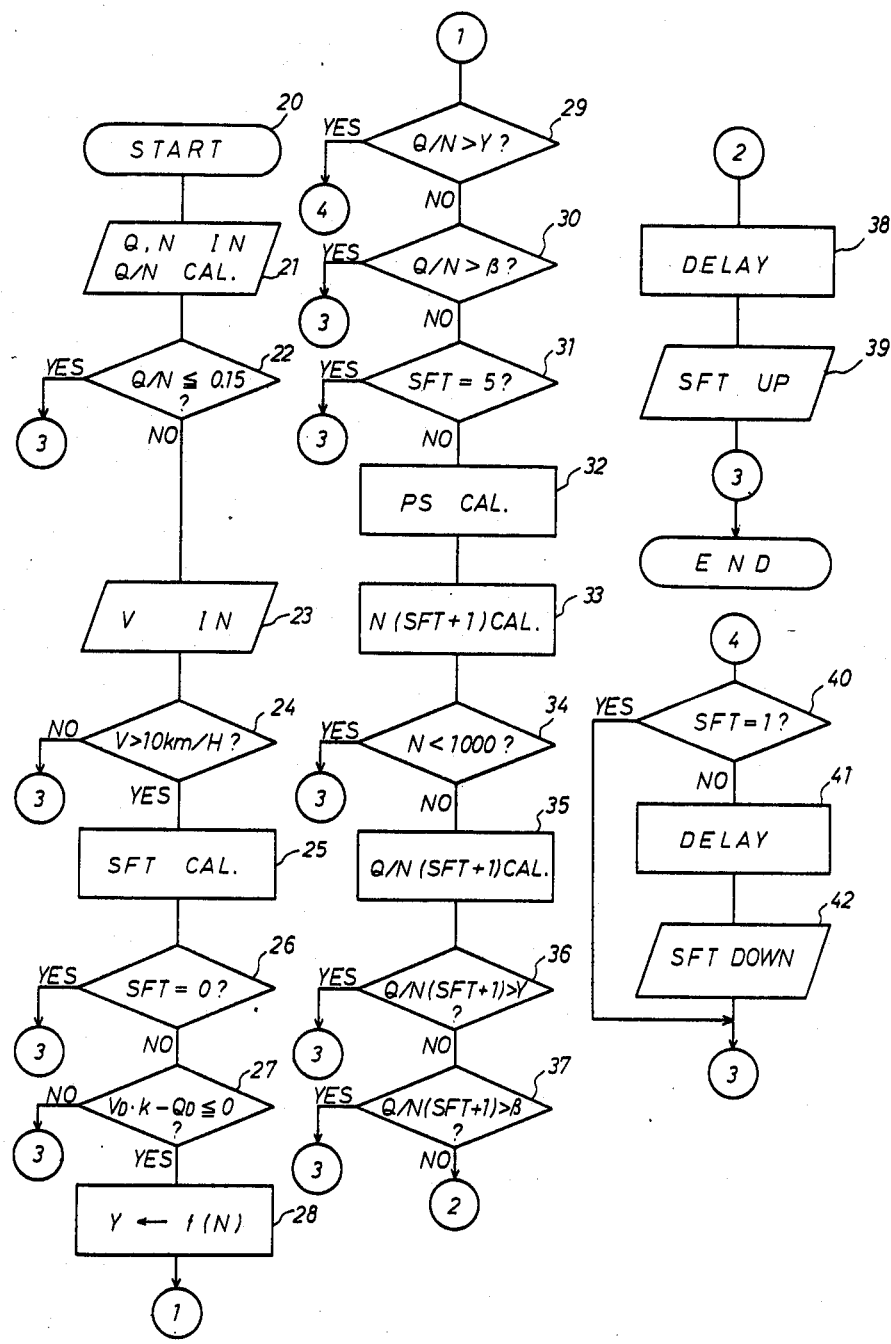
FIG. 4 illustrates various control program flow charts for realizing the embodiment of the method for indicating speed change operations according to the present invention.

FIG. 4 shows control program flow charts which operate the system including the control unit 9 so as to realize the advantages according to the present invention. The operation for indicating speed change operations according to the present invention will now be made with reference to FIGS. 3 and 4. The shift program 20 shown in FIG. 4 is started to operate by a timer signal from a timer, not shown, which is produced once for every one second, for instance, at a predetermined timing during a main routine or the control program necessary for the car running.

First of all, after the shift program 20 is started, the operation firstly moves to the step 21, where the signals from the crank angle sensor 8 and from the air flow meter 2 are applied to the CPU 12 through the I/O port 11 and the engine load Q/N is calculated in accordance with the engine speed N and the intake air flow Q (1/min.) and now the operation moves to the next step 22.

In the step 22, a decision or determination is made as to whether or not the engine load Q/N calculated in the step 21 is below a predetermined value, e.g. 0.15. If the result of the determination is YES, that is, Q/N≦0.15, the operation of this routine terminates without executing further operations, as the intake air flow of the car now running is very small in view of the air flow meter 2 and the car is in the deceleration condition. Thus, further reduction of the fuel is not necessary. On the other hand, however, if the result of the determination is NO, i.e. Q/N>0.15, the operation now moves to the next step 23.

In the step 23, the current car speed V is detected from the tacho meter 6 and is stored into the RAM 14 and the operation now moves to the next step 24.

In the step 24, another decision is made whether or not the car speed obtained in the previous step 23 is larger than a predetermined value, e.g. 10 km/H. If the result of the decision is NO, i.e. the car speed is below 10 km/H, the operation of this routine terminates as the car has just started and no shift of gear operation is required. However, on the other hand, if the result of the decision is YES, that is V>10 km/H, the operation now moves to the next step 25 as the car is running in the normal condition.

In the step 25, the current shift position SFT is calculated from the car speed V, the engine speed N and the transmission gear ratio of the transmission 5 in the current running condition and the operation now moves to the next step 26. In this case, when the clutch operation is performed, a correct or suitable shift position cannot be decided as the gear ratio in calculation corresponding to the car speed V an the engine speed N differs from the actual transmission gear ratio of the transmission 5, whereby the gear is considered to be in the neutral position (SFT=0).

In the step 26, a decision is made whether or not the current shift position SFT is in the neutral position. If the result of the decision is YES, that is, it is in the neutral position, the operation now terminates without executing further operations of this shift program 20, as the car is not in the normal running condition. On the other hand, however, if the result of the decision is NO, i.e. the current shift position is not in the neutral position, the operation now moves to the next step 27.

Figure 5:
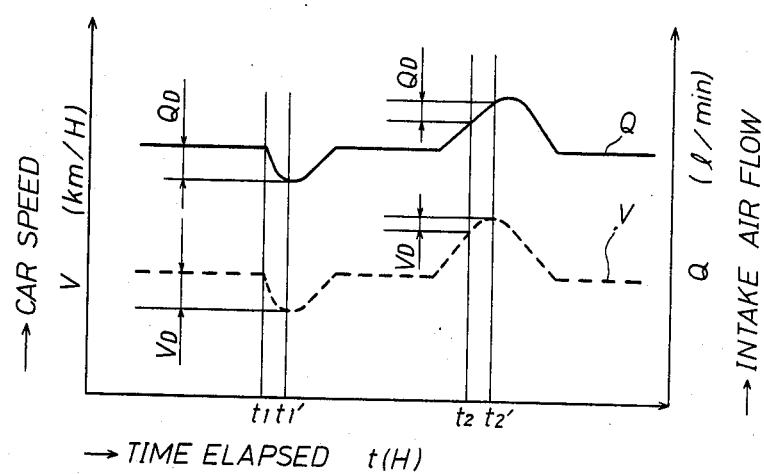
FIG. 5 illustrates a characteristic graph for explaining amount in change of the car speed and amount in change of the intake air flow.

The step 27 constitutes a main step of the embodiment according to the present invention, which will be described in the following with reference to FIG. 5 which shows characteristics between the car speed V and intake air flow Q and the time elasped T (H). As shown in FIG. 5, the absolute change $V_D$ in the car speed V is calculated by subtracting the instantaneous value of $V_O$ measured at the time point $t_1$ or $t_2$ previously, from the instantaneous value of V measured at the time points $t'_1$ or $t'_2$ this time. On the same way, the absolute change $Q_D$ in the intake air flow Q is calculated. Then, the calculation of $V_D.K-Q_D$ is performed by multiplying the absolute value of the variable $V_D$ by a correlation factor K and then by subtracting $Q_D$ from the product. Then, a comparing operation is performed with respect to the value $V_D.K-Q_D \leq 0$. If the result of the comparison is YES, i.e. the value $V_D.K-Q_D$ is below 0, the operation moves to the next step 28. On the other hand, however, if the result of the comparison is NO, the operation terminates without executing any further speed change operation of this program 20, as it is considered that the car is running on a slope, and no speed change operation is necessary in this case.

The description will now be made here about the relationship between the factors of $V_D.K$ and $Q_D$ for the speed change determination. When the car has started running and then is running in an accelerated condition on a flat road, the accelerator is normally strongly depressed so that the variable $Q_D$ of the intake air flow Q becomes relatively larger than that $V_D$ of the car speed V. Accordingly, the value $V_D.K-Q_D$ becomes below 0 i.e. $V_D.K-Q_D<0$ and it is preferable to make the speed change determination.

Next, when the car is running on an ascending slope, the variable of the intake air flow Q and the variable of the car speed V substantially become equal, subject to the condition that the car is running at generally a constant speed so that $V_D.K-Q_D=0$ is obtained in this case, whereas in the accelerated condition of the car the change in car speed is delayed as compared with the change in Q in this case, so that the value of $V_D.K-Q_D$ becomes below 0. Accordingly, it is preferable to carry out the speed change in either case. In addition, when the accelerator pedal is released by the driver, the car enters into a decelerated condition and the car speed V changes drastically. Accordingly, the variable or the amount of change in the car speed $V_D$ becomes relatively larger than that of the intake air flow $Q_D$, so that $V_D.K-Q_D>0$ can be obtained.

Since the engine is operated in a high speed, and it is in a light load condition in this case, the shift-up determination will be necessarily done in the speed change decision. Accordingly, the engine vibrations increase and the running of the car becomes difficult as a large or heavy load is imposed to the engine if the shift-up operation is performed in this case, not withstanding the decelerated running condition of the car on the ascending slope where the shift-down operation should be performed.

Accordingly, it is not suitable to make the speed change determination in this case.

Moreover, the description will now be made in the case where the car is running on a descending slope.

When the decelerated running of the car is performed where the engine brake should be in operation with the fuel reduced condition, no speed change decision is made, different from the situation in the step 22. Also, when the car is running at an almost constant speed in addition to the condition that the ratio Q/N is above a predetermined value in the step 22, it is preferable to run the car under a better fuel consumption rate by performing the speed change decision as the variable $Q_D$ of the intake air flow Q becomes relatively equal to the variable $V_D$ of the car speed V and $V_D.K-Q_D=0$ is obtainable.

When the accelerator pedal is operated on the descending slope, the car speed V rapidly increases and the variable $V_D$ of the car speed becomes relatively larger than the variable $Q_D$ of the intake air flow Q, that is $V_D.K-Q_D>0$ is established. In such a case as described, since the engine speed becomes high and in the light load condition, the shift-up determination is made when the speed change decision is required. The shift-down operation while running on a descending slope operates the engine brake, to limit vehicle speed. But if the shift-up operation is performed instead of the shift down, the engine brake would become ineffective and it would invite a dangerous further acceleration in this case. Hence, it is not suitable to make the normal speed change decision in this case.

Now, turning the description back to the foregoing operation, the operation now moves to the step 28 after executing the step 27.

Figure 6:
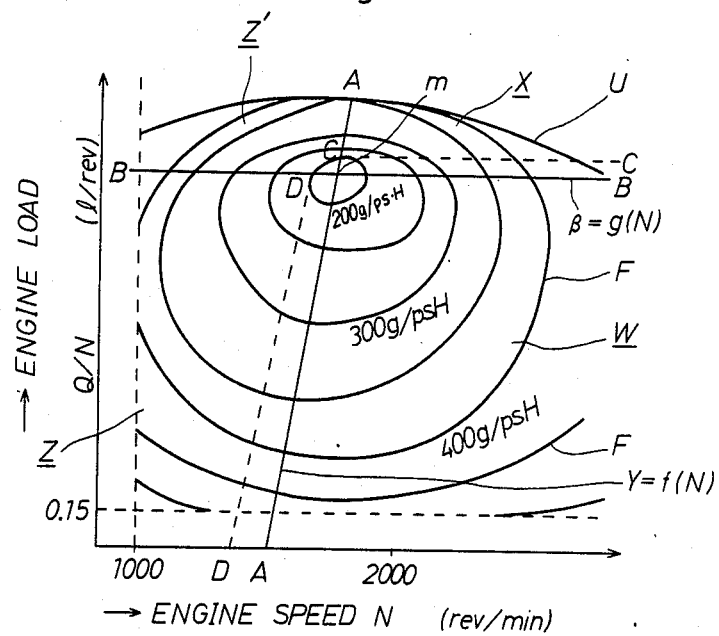
FIG. 6 illustrates equal fuel consumption rate curves divided by the load lines A—A and B—B, etc.

In the step 28, the engine load Y on the line A—A which corresponds to the current engine speed N is calculated from the function Y=f (N) of the equal fuel consumption rate curves F as shown in FIG. 6 which are defined by the engine characteristics to be applied to the embodiment according to the present invention. In FIG. 6, the line A—A is drawn as a straight line which passes through the center m of the equal fuel consumption rate and which also passes within the area where the engine load Q/N has the lowest discrepancies in the values of each equal fuel consumption rate.

The equal fuel consumption rate curves F in FIG. 6 are drawn in such a manner that each fuel consumption rate defined by the engine load Q/N and the engine speed N is sought by experiments and is plotted. From the curves, it is appreciated that a same fuel amount is to be consumed for the car which is running in the same curve on one of the equal fuel consumption rate curves marked F, even when the engine load Q/N and the engine speed N differ respectively. The curve U in FIG. 6 shows the limit of the engine load.

In the subsequent step 29, the engine load Y on the line A—A calculated in the previous step 28 is compared with the current engine load Q/N. If the result of the comparison or determination as to whether or not the engine load Y is below Q/N, i.e. NO, the operation now moves to the steps 40, 41 and 42 so as to display the shift-down operation to be taken by the driver as it is preferable to make the shift-down operation in view of the fuel consumption rate.

In the step 40, a determination is made whether or not the current shift position SFT is in the first speed, that is SFT=1, then the operation of this program 20 terminates as the further shift-down operation cannot be performed from the current shift position SFT, if the result of the determination is YES, i.e. SFT=1. If the result of the determination is NO, i.e. SFT≠1, the operation now moves to the next step 41.

In the step 41, when the current engine load Q/N is substantially equal to the engine load Y which was calculated in accordance with the function Y=f (N), a delay time operation is performed which delays the progress of the program by a suitable time so as no to give the driver a confusion by flashing the shift-down indication on the display 10 at a short time and the operation now moves to the next step 42.

In the step 42, the operation for displaying the shift-down operation to be taken for the driver is carried out on the display unit 10 and the operation then terminates.

The operations to be performed in the steps 29 to 40 and step 42 will be described in detail in the following, with reference to FIG. 7.

Figure 7:
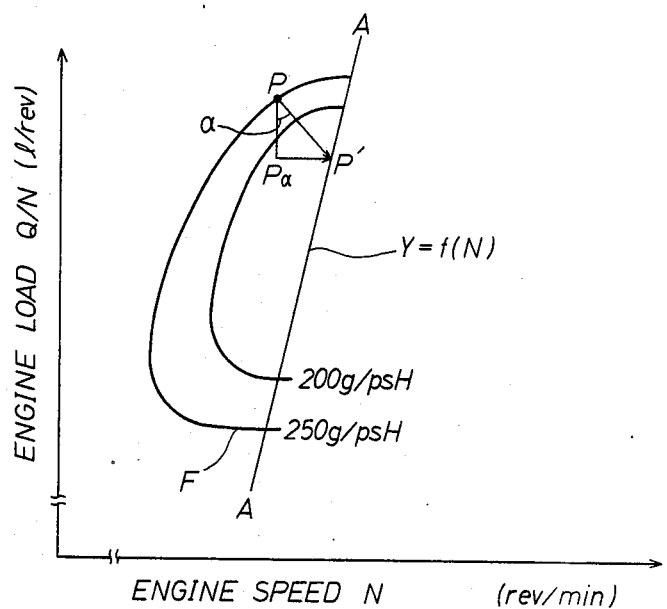
FIG. 7 illustrates a partially enlarged view of the graph shown in FIG. 6 for explaining the change in the fuel consumption rate after a shift operation is performed.

FIG. 7 shows a partially enlarged characteristic curves shown in FIG. 6. As is appreciated from the figure, the equal fuel consumption rate curve F shows itself a good fuel condition toward the inner direction of the curve. Accordingly, when the current engine load Q/N is located, for instance, above the line A—A, say at the point P, the shift-down operation should be performed so as to maintain the same horse power PS and a new engine load Q'/N' and a new engine speed N' are sought which do not lower the car speed V. In this case, the new engine load Q'/N' is found to be located at the place down by P-Pa, while the new engine speed N' is found to be located at the place by Pa- P'. The fuel consumption rate however becomes improved from 250 g/ps.H to less than 200 g/ps.H on the equal fuel consumption rate curves F.

From the above fact, it follows that if the current engine load Q/N is situated above the line A—A, the shift-down operation to be performed is indicated on the display 10 so as to improve the fuel consumption rate. On the other hand, if the result of the decision in the previous step 29 is NO, i.e. Q/N≦Y, the operation now moves to the next step 30.

In the step 30, a decision is made whether or not the current engine load Q/N is in the high load condition, that is, the current engine load Q/N is above the engine load $\beta$=g (N) indicated by the line B—B.

The explanation will now be made about the line B—B in FIG. 6. The line B—B is indicated as the function $\beta$=g (N) which passes through the point m located generally in the center of the euqal fuel consumption rate curves F. The inclination of the tangent of the equal fuel consumption rate curves is inverted at the border line B—B.

Figure 8:
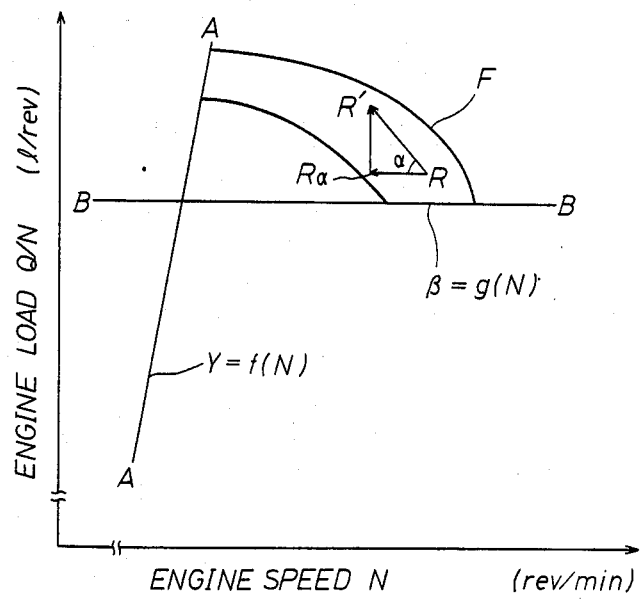
FIG. 8 illustrates a partially enlarged view of the graph shown in FIG. 6 for explaining the change in the fuel consumption rate after another shift operation is performed.

In FIG. 8 which is partially enlarged view of FIG. 6, supposing that the car is running under the equal fuel consumption rate shown by the point R, when the shift-up operation is performed from the current shift position, the new position moves to the point R' with the same horse power PS maintained, so as to seek the new engine speed N and the new engine load Q/N without changing the car speed V, by shifting the point down from R to Ra in engine rotation N and also by shifting the point up from Ra to R' in engine load Q/N.

It is to be understood that even if the shift-up operation is performed at the point R under the equal fuel consumption rate curves F during the current running condition, there is no change on the fuel consumption rate.

Accordingly, when the result of the determination or comparison is Q/N≦Y and the current engine load Q/N is located at a place higher than that of the function $\beta$ in the step 30, neither shift-down nor shift-up operation is required. Accordingly, the operation of the program 20 terminates. On the other hand, however, the result of the determination is NO, i.e., the current engine load Q/N is below the function $\beta$, the operation now moves to the next step 31.

In the step 31, a decision is made if the current shift position SFT which was determined in the previous step 25 is in the topmost shift position in the transmission having a five-step change gear as in the case of the present invention. If the result of the decision is YES, i.e. SFT=5, the operation terminates or further execution of this program is not carried out as further shiftup operation is not possible. On the other hand, however, if the result of the decision is NO, i.e. SFT≠5, the operation now moves to the next step 32.

In the step 32, the current horse power output PS is calculated from the current engine load Q/N and the current engine speed N and the operation moves to the next step 33.

In the step 33, the engine speed N (SFT+1) necessary for maintaining the same car speed when one step shift-up operation is performed from the current shift position SFT, is calculated from the gear ratio of the transmission 5 and the operation now moves to the next step 34.

In the step 34, a decision is made if the engine speed N (SFT+1) calculated in the previous step 33, is in a predetermined low speed zone, e.g. 1000 rev.. If the result of the decision is YES, i.e. below 1000 rev., the operation of this program terminates as the engine vibrations will become large when the shift-up operation is performed. On the other hand, however, if the result of the decision is NO, i.e. N≧1000, the operation now moves to the next step 35.

In the step 35, the engine load Q/N (SFT+1) is calculated from the horse power PS calculated in the step 32 and the engine speed N (SFT+1) calculated in the step 33, necessary for maintaining the current horse power PS and the current car speed after one step shift-up operation is performed and the operation now moves to the next step 36.

In the step 36, a decision is made if the engine load Q/N (SFT+1) is above the corresponding engine load Y on the line A—A in the engine speed N (SFT+1). If the result of the decision is YES, i.e. Q/N (SFT+1)>Y, the operation of this program terminates without performing the operations for the shift-up indication which will be described later with respect to the steps 38 and 39 as it is indicated that it is preferable to perform the shift-down operation if the shift-up operation is performed. On the other hand, however, if the result of the decision in the step 36 is NO, i.e. Q/N (SFT+1)≦Y is found, the operation now moves to the next step 37.

In the step 37, a decision is made whether or not the engine load Q/N (SFT+1) after the shift-up operation is above the engine load β indicated as the line B—B. If the result of the decision is YES, the operation of this program terminates without executing the operations for the shift-up indication as the fuel consumption rate will be remained unchanged. On the other hand, however, if the result of the decision is NO, i.e. Q/N (SFT+1)≦β, the operation now moves to the steps 38 and 39.

Figure 9:
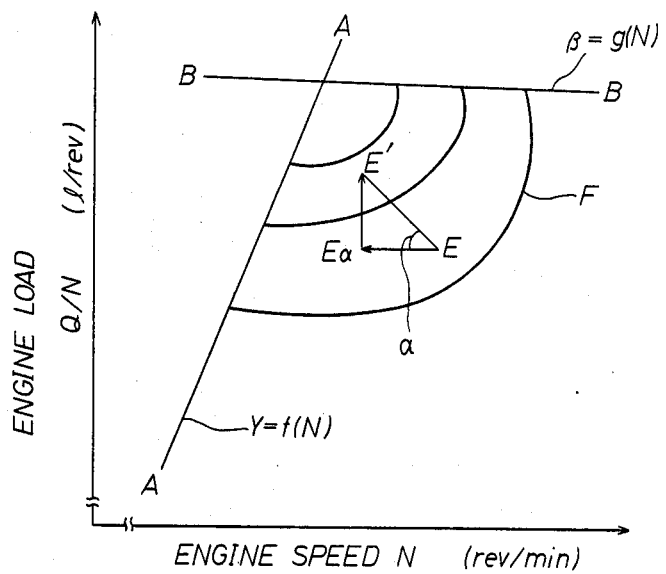
FIG. 9 illustrates a partially enlarged view of the graph shown in FIG. 6 for explaining the change in the fuel consumption rate after still another shift operation is performed.
Figure 10:
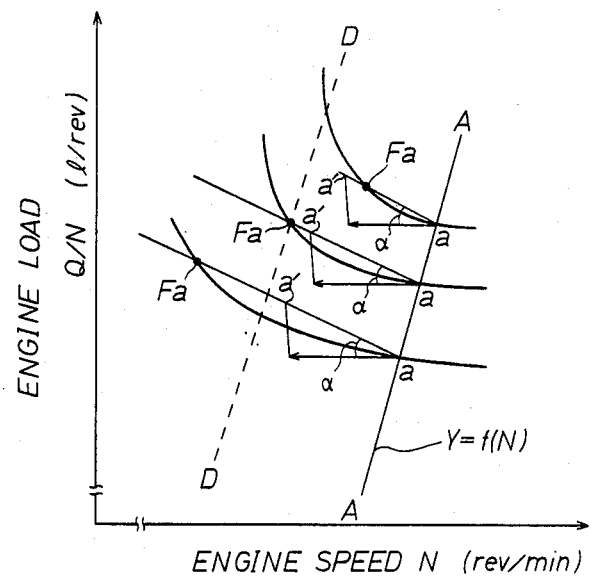
FIG. 10 illustrates a partially enlarged view of the equal fuel consumption rate curves for seeking another engine load line D—D in FIG. 6.

The operations in the steps 36 and 37 will be performed as follows; In FIG. 9 which is a partially enlarged view of the curves in FIG. 6, if one step shift-up operation is performed with the same horse power PS and the same car speed V at the point E maintained, the engine load Q/N increases the amount of Eα−E' while the engine speed N decreases the amount of E−Eα, thus reaching the point E' on the equal fuel consumption rate curves F. From the curves F, it is to be appreciated that the fuel consumption rate at the point E' is better than the one at the point E. Accordingly, the result of the decision is that the shift-up operation should be performed in this case. As a result, the operations for the shift-up indication are executed in the steps 38 and 39.

In the step 38, the delay time operation similar to that in the step 41 is performed an the operation now moves to the next step 39.

In the step 39, the operation for indicating on the display 10 the shift-up operation to be taken by the driver is performed and then the operation of this program terminates.

As described in the foregoing, in the method for performing shift operations to be taken by the driver of the car according to the present invention by use of the program 20, the equal fuel consumption rate curves F which are defined by the engine load Q/N and the engine speed N are divided into four sections or zones W, X, Z and Z' devided by the lines A—A and B—B indicated by the functions Y=f (N) and β=g (N) in FIG. 6, and when the fuel consumption rate of the car under the current running conditions falls within the zones Z' and Z, a shift-down indication is displayed on a display by determining that the shift-down operation enables the fuel consumption rate to be improved so as to maintain the current horse power PS an the current car speed V, while when the fuel consumption rate falls under the zone X, no indication for performing either the shift-up or the shift-down operation is carried out as the fuel consumption rate cannot be improved even if the above operation is performed.

In addition, when the fuel consumption rate falls on the zone W, the speed change decision is made so as to indicate the shift-up operation, on the condition that the fuel consumption rate after the shift-up operation does not come in any other zones and then the determination of $V_D.K − Q > 0$ is made, which includes the absolute value $V_D$ of the car speed variable and the absolute value $Q_D$ of the intake air flow variable. If the result of the determination or comparison is YES, i.e., $V_D.K − Q_D > 0$, no speed change is performed. For this reason, the speed change indication having a high reliability is carried out as well as it results in an improvement in the fuel consumption rate.

In the invention described in the foregoing embodiment according to the present invention, the load line A—A is expressed by a first order function of the straight line, but it may be a curve expressed by a second order function which approximates the line plotted between smallest points of the engine load Q/N on the equal fuel consumption rate curves F. Moreover, it is to be understood that instead of the engine load Q/N, any of the engine torque proportional to the engine load, for intstance, intake manifold negative pressure, or fuel injection amount, the injection time if the car is provided with an electronic fuel injection control unit may be utilized for the operation.

Moreover, in the embodiment according to the present invention described in the foregoing, the zones may be divided in such a manner that each fuel consumption rate α' after the shift-up operation is sought from each cross point a between the equal fuel consumption rate curves F and the load line A—A and from the inclination angle of α and then each cross point Fa formed between each line connecting the points a—a' and the equal fuel consumption rate curves F in the zone Z is sought and finally the line D—D may be drawn within the areas where each point Fa falls on, which is parallel to the line A—A so as to distinguish the zones, or alternatively, the zones may be divided by the line C—C which is parallel to the line B—B as shown in the dotted line in FIG. 6.

In the zones divided by the lines C—C and D—D there is no change in the fuel consumption rate even if the shift-down operation is performed, but noise will be reduced in the degree the engine speed N decreases, with an advantage that the durability of the engine can be improved.

Although the foregoing description has been made about a car having a manual type transmission as one example of the embodiments according to the present invention, it is also apparent that the present invention can be applied to a car provided with an automatic transmission of the electronic control type, by producing and giving a speed change instruction signal to the automatic transmission, instead of displaying the shift-up or shift-down indication on the display 10, in accordance with the control program 20.

As described in the foregoing embodiment of the method for indicating the speed change operations to be taken by a driver according to the present invention, another feature thereof resides in the method which comprises the steps of comparing the absolute values of the car speed variables and the absolute values of the intake air flow variables and suspending the speed change determination when the speed change operation should not be performed from the result of the comparison.

According to the present invention, a suitable shift position for achieving optimum fuel consumption rate can be indicated on a display for the driver of the car by maintaining the current car speed during running, whereas no indication of the speed change when not required is made while running on the slope.

Accordingly, the driver of the car to which the method according to the present invention applied can run the car under optimum fuel consumption rate for the engine in accordance with the indication of either shift-up operation or a shift-down operation to be taken by the driver.

Moreover, according to the present invention as it is not necessary to store a large volume of data maps into the ROM in order to control the fuel consumption rate, and the electronic control unit for controlling and processing data can be made small and at low cost.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. An apparatus for indicating a gear shifting operation for a vehicle transmission, comprising:
   means for determining an air flow;
   means for determining an engine speed;
   processing means for:
   calculating current engine load from the intake air flow and the engine speed,
   comparing said calculated engine load with a predetermined engine load constant;
   again calculating engine load if said comparision determines that said current engine load is less than or equal to said predetermined constant;
   calculating a current shift position from current engine speed, current vehicle speed and the known transmission gear ratio;
   determining a first engine load operation function and a second operation engine load function from predetermined equal fuel consumption rate curves;
   comparing said first engine load operation function with said current engine load; and
   determining if the vehicle is running on a slope which is steeper than a predetermined amount, by using the vehicle speed, and air flow;
   shift determination means for indicating a shift-down operation to be performed if said first operation function has a value greater than said current engine load, performing additional steps for potential shift-up operation indication if said first operation function has a value less than or equal to said current engine load, calculating current engine horsepower from said current engine speed and current engine load Q/N and inhibiting shift up and shift down operations when said vehicle is determined to be running on said slope steeper than a predetermined amount;
   and wherein said processing means is also for calculating expected engine speed necessary for maintaining said current vehicle speed if there is a one shift-up operation performed on said transmission.

2. Apparatus as in claim 1 wherein said processing means is also for:
   determining if said current shift position is in the neutral position.

3. Apparatus as in claim 1, wherein said processing means is also for determining whether said current engine load is above said second operation engine load function.

4. Apparatus as in claim 3, wherein said indicating means does not perform an gear shifting operation indications if said current engine load is higher than said second operation engine load function.

5. Apparatus as in claim 1, wherein said CPU means is also for:
   comparing said expected engine speed with a second predetermined constant, and
   calculating expected engine horsepower and expected engine load when one shift-up operation is performed in accordance with said calculated horse power and said expected engine speed.

6. Apparatus as in claim 5, wherein said processing means is also for determining whether said expected engine load is above both said first operation engine load function and said second operation engine load function, and said shift determining means is also for indicating a shift-up operation if said determining function is so determined.

7. Apparatus as set forth in claim 1, wherein said CPU means is also for storing in advance a fuel consumption rate curve map in a read only memory for use in engine load calculations.

8. Apparatus for indicating gear shifting operation as set forth in claim 1, wherein said first and second engine load operation functions are straight lines, respectively.

9. Apparatus for indicating gear shifting operation as set forth in claim 1, wherein said first and second engine load operation functions are curves, respectively.

10. A gear shifting operation indication apparatus comprising:
    an engine rotation sensor for detecting current engine speed;
    a speed meter for detecting actual speed of a car;
    an air flow meter for detecting an intake air flow;
    control unit means, responsive to said sensor and said meters, for determining shifting operation indications;
    an indicator, responsive to said control unit means, for indicating either shift-up or shift-down operation based on said control means determination;
    said control unit means comprising means for:
    calculating current engine load from the intake air flow and the engine speed,
    comparing said current engine load thus calculated with a predetermined engine load constant,
    recalculating said current engine load if said comparison finds said current engine load less than or equal to said predetermined constant, calculating current shift position from current engine speed, current vehicle speed V and the known transmission gear ratio, determining a first engine load operation function and a second operating engine load function from known equal fuel consumption rate curves, comparing said first operating load operation function with said current engine load, indicating a shift-down operation to be performed if said first function has a value greater than said current engine load, performing additional functions for indicating a subsequent shift-up operation if said first function has a value less than or equal to said current engine load, calculating current engine horsepower PS from said current engine speed and current engine load, calculating expected engine speed necessary for maintaining said current car speed if there is a one shift-up operation performed on said transmission, determining if said car is running on a slope greater than a predetermined amount, and indicating no shift operations when said car is running on said slope.

11. Apparatus for indicating gear shifting operations for a vehicle transmission, comprising:

means for determining air flow;

means for determining vehicle speed;

processing means for:

calculating current engine load from the intake air flow and the engine speed;

comparing said current engine load thus calculated with a predetermined engine load constant;

again calculating engine load if said comparison determines said current engine load to be less than or equal to said predetermined constant;

calculating a current shift position from current engine speed, current vehicle speed and a known transmission gear ratio;

determining a first engine load operation function and a second operating engine load function from known equal fuel consumption rate curves;

comparing said first operating load operation function with said current engine load; and deterimining a degree of slope upon which the vehicle is running; and shifting means for:

indicating a shift-down operation to be performed if said first operation function has a value greater than said current engine load;

performing additional steps for potential shift-up operation indication if said first operation function has a value less than or equal to said current engine load;

establishing a data map based on said current engine speed and current engine load;

dividing said map into roughly four quadrants by said first and second engine load operation function;

indicating a shift-up operation when said calculated engine load is in a lower right-hand quadrant;

indicating a shift-down operation when said calculated engine load is in one of the left-hand quadrants;

indicating no shift operations when said engine load is in the upper right-hand quadrant of said data map; and indicating no shift operations when said vehicle is running on a slope.

12. A gear shifting operation indication apparatus comprising:

an engine rotation sensor for detecting current engine speed;

a speed meter for detecting actual speed of a car;

an air flow meter for detecting an intake air flow;

control unit means, responsive to said sensor and said meters, for determining shifting operation indications;

an indicator, responsive to said control unit means, for indicating either shift-up or shift-down operation based on said control means determination;

said control unit means including means for:

calculating current engine load from the intake air flow and the engine speed, comparing said current engine load thus calculated with a predetermined engine load constant, recalculating said current engine load if said comparison finds said current engine load less than or equal to said predetermined constant, calculating current shift position from current engine speed, current vehicle speed and the known transmission gear ratio, determining a first engine load operation function and a second operating engine load function from known equal fuel consumption rate curves, comparing said first operating load operation function with said current engine load, indicating a shift-down operation to be performed if said first function has a value grater than said current engine load, performing additional functions for indicating subsequent shift-up operation if said first function has a value less than or equal to said current engine load, establishing a data map based on said current engine speed and current engine load, dividing said map into roughly four quadrants by said first engine load operation function and said second engine load operation function, determining when said car is running on a slope steeper than a predetermined amount, indicating a shift-up operation when said calculated engine load is in a lower right-hand quadrant, indicating a shift-down operation when said calculated engine load is in either of the left-hand quadrants, indicating no shifting operations when said engine load is in the upper right-hand quadrant of said data map, and indicating no shift operation when said car is running on said slope sleeper than said predetermined amount.

13. Apparatus for indicating an optimum gear shifting operation for minimizing fuel consumption in a vehicle having a manual transmission, comprising:

detecting means for detecting various engine parameters; microprocessor means including a read-only-memory, a random access memory, and a central processing unit for maintaining constant vehicle speed and constant engine power responsive to signals from said detecting means and for outputting an indicating signal indicative of the optimum gear shift operation; and indicating means responsive to said indicating signal for indicating said gear shift operation;

wherein said microprocessor means is for:
(a) storing a map of isometric curved lines that represent curves of equal fuel-consumption as defined on a load/speed diagram in said random-access memory, and using two curves to separate said map into three areas, one curve represented by a first engine load operation function Y and crossing the points representing the minimum fuel consumption rate of each of said isometric curved lines and the other curve represented by a second engine load operation function, said other curve determines whether an engine load is defined as high, wherein said three area defined on said map comprise:
  (1) a first area in which the value Y of said first engine load operation function corresponds to a currently detected engine speed which is less than the current engine load;
  (2) a second area in which the value of Y of said first engine load operation function corresponds to the detected engine speed being more than the value of the current engine load with the value corresponding to the detected engine speed being more than the current engine load; and
  (3) a third area in which the value of Y of said first engine load operation function corresponding to the detected engine speed is more than the value of engine load with the value Y of said first engine load operation function corresponding to currently detected engine load being less than the current engine load;
(b) outputting a signal to said indicating means to cause said indicating means to output a signal indicative of one-step downshifting whenever a detected point determined by a combination of said detected engine speed and said engine load is in said first area;
(c) indicating no gear changing operation if said detected point is in said second area;
(d) outputting a signal to said indicating means to cause said indicating means to output a signal indicative of one-step upshifting whenever said detected point determined by said combination of said detected engine speed and engine load is in said third area;
(e) determining if said vehicle is running on a slope steeper than a predetermined amount; and
(f) indicating no gear changing operations when said vehicle is determined to be on said slope greater than said predetermined amount.

14. Apparatus as in claim 13 wherein when said detected point is in said third area, said microprocessor means is also for:
calculating current engine power and one-step upshifted engine speed from the current shift position, based on the known gear ratio of the vehicle transmission;
calculating one-step upshifted engine load from the current engine power and the engine shift position; and
outputting a signal indicative of said upshifting to said indicating means.

15. Apparatus as in claim 13 wherein said microprocessor means executes said functions (a)-(d) only if the current engine load is less than a first predetermined value, the current engine speed is more than a second predetermined value, and the present shift position is a position other than neutral.

16. Apparatus as in claim 14, wherein said steps (a)(1) and (a)(2) are performed only whenever said engine speed is within a predetermined range.

17. Apparatus as in claim 13, wherein said microprocessor does not indicate one-step upshifting whenever the present shift position is in the highest gear, and does not indicate one-step downshifting whenever the present shift position is in the lowest gear, and in any event indicates upshifting and downshifting only alter a delay time has elapsed.

* * * * *